United States Patent [19]

Samukawa et al.

[11] Patent Number: 5,726,441

[45] Date of Patent: Mar. 10, 1998

[54] SOLAR SENSOR FOR A VEHICLE

[75] Inventors: Katsuhiko Samukawa, Obu; Yuji Honda, Okazaki, both of Japan

[73] Assignee: Nippondenso Co., Ltd., Kariya, Japan

[21] Appl. No.: 665,552

[22] Filed: Jun. 18, 1996

[30] Foreign Application Priority Data

Jun. 21, 1995 [JP] Japan .................................. 7-154674

[51] Int. Cl.$^6$ .................................................. H01J 40/14
[52] U.S. Cl. .................. 250/214.1; 250/214 LS; 359/353
[58] Field of Search ................ 250/214.1, 214 R, 250/330, 332, 214 LS, 214 AL, 214 D, 214 C; 359/353, 350, 361, 229, 27 S, 601–603; 257/431; 340/943

[56] References Cited

U.S. PATENT DOCUMENTS 5,239,406  8/1993  Lynam .................................. 359/350

FOREIGN PATENT DOCUMENTS

3-109084  11/1991  Japan .

*Primary Examiner*—Que Le
*Attorney, Agent, or Firm*—Cushman, Darby & Cushman IP Group of Pillsbury, Madison & Sutro LLP

[57] ABSTRACT

By giving an attention to the fact that the difference in the transmittance of solar radiation in the visible light region is small for each type of glass, even though the type of window glass is changed, the sensitivity ratio α of a sensor element 43a in a solar sensor 43 is set to be from 0.8 to 5 so that it has a spectral sensitivity closer to the visible light region in comparison with a conventional solar sensor. By this, the variation in the deviation of the sensor outputs depending on the types of the window glass is eliminated. Thus, a target sensor output corresponding to the amount of solar radiation can be attained without being influenced by the types of the glass, even when the transmittance for the wavelengths of sun light changes depending on the types of the glass.

36 Claims, 10 Drawing Sheets

1
SOLAR SENSOR FOR A VEHICLE

BACKGROUND OF THE INVENTION

1. Field of the Invention

The present invention relates to a solar sensor for a vehicle, for generating signals in response to the amount of solar radiation transmitted through a window glass of the vehicle. The solar sensor is advantageously used for automatic temperature control in an air conditioning apparatus for a vehicle.

2. Description or the Related Art

In the prior art, Japanese Utility Model Publication (Kokai) No. 3-109484 discloses a solar sensor used for an automatic control of the temperature in an air conditioning apparatus for a vehicle, in which a sensor element is covered by a colored trim cover which can transmit light of only wavelengths longer than 600 nano meters, in order that the sensor element, wiring and so forth can not be seen from the compartment of the vehicle.

In the sensor element disclosed in the above publication, most of a visible light region in the solar light is cut by employing the above-mentioned trim cover so that it has a sensitivity mainly in a wavelength band near the infrared region.

On the other hand, in recent years, in order to reduce thermal load in vehicles, new window glass which can lower the transmittance of solar radiation has been developed, and is increasingly employed in high class vehicles.

However, according to experiments and researches by the inventors of the present invention, the window glass having the lower transmittance of solar radiation has various transparency characteristics with respect to light wavelengths, depending on the types of the glass.

Because of the difference in the transparency characteristics, the target value of the solar sensor with respect to the region of all wavelengths varies depending on the types of the glass. On the other hand, the solar sensor disclosed in the above publication has a sensitivity mainly in the near infrared region. Therefore, it has been found that the deviation between the sensor output of the solar sensor disclosed in the above publication and each target value further varies depending on the types of the glass.

In an air conditioning apparatus of a vehicle, when the output signal from the solar sensor is used to control the air condition, there is a deviation of the output of the solar sensor from the target value, resulting in problems in that the temperature of the compartment of the vehicle cannot be controlled to a desired value, and the temperature or the amount of air to be blown in the compartment of the vehicle cannot be controlled in accordance with a given design so that a bad influence is effected on the sense of warmth or the feeling for the air conditioning. Further, since the deviation varies depending on the types of the glass, the above problems become more serious.

It may be considered that, for individual glass, the output of the solar sensor is adjusted to be the target value, however, since various types of window glasses are used in one type of vehicle, said adjustment is, in practice, very difficult.

SUMMARY OF THE INVENTION

In view of the above problems, an object of the present invention is to provide a solar sensor for a vehicle in which the variation in the deviation of the output of the solar sensor from the target value, due to the difference of the light transparency characteristics depending on the types of the glass, can be reduced.

According to the first aspect of the present invention, there is provided a solar sensor for a vehicle, for receiving incident solar radiation transmitted through a window glass of the vehicle, wherein the solar sensor has a sensitivity in a wavelength band from a visible light region to an infrared region, and the solar sensor has a spectral sensitivity with a sensitivity ratio within a range form 0.8 to 5.0, where the sensitivity ratio being expressed as: (a sensitivity for wavelengths longer than 700 nm)/(a sensitivity for wavelengths shorter than 700 nm).

According to the second aspect of the present invention, the solar sensor in the first aspect of the present invention has a spectral sensitivity with a sensitive ratio within a range from 1 to 3.

According to the third aspect of the present invention, in the solar sensor in the first or the second aspect of the present invention, the spectral sensitivity resides within a range between 500 nm and 800 nm among the solar radiation wavelength band.

According to the fourth aspect of the present invention, the solar sensor in any one of the first to third aspect of the present invention further comprises a sensor element for generating a signal in accordance with the amount of solar radiation; a cover member with a light transparency characteristic, arranged to cover the sensor element; and a pedestal for supporting the sensor element and the cover member.

According to the fifth aspect of the present invention, the solar sensor in any one of the first to the third aspect of the present invention further comprises a sensor element for generating a signal in accordance with the amount of solar radiation; and a cover member with a light transparency characteristic, arranged to cover the sensor element; and the sensor element is so constructed as to satisfy the spectral sensitivity requirement.

According to the sixth aspect of the present invention, the solar sensor in any one of the first to the third aspect of the present invention further comprises a sensor element for generating a signal in accordance with the amount of solar radiation and a cover member with a light transparency characteristic, arranged to cover the sensor element; the cover member selectively transmitting solar light having a wavelength band between 500 nm and 800 nm so as to satisfy the spectral sensitivity requirement.

According to the seventh aspect of the present invention, there is provided a control apparatus for a vehicle comprising the solar sensor described in any one of the first to sixth aspects of the present invention, and a control unit for receiving the detected signals from the solar sensor to drive and control apparatuses mounted in the vehicle.

According to the eighth aspect of the present invention, there is provided an air conditioning control apparatus for a vehicle comprising the solar sensor described in any one of the first to sixth aspects of the present invention, and an air conditioning control unit for receiving the detected signals from the solar sensor to control the air conditioning state of an air conditioning apparatus for the vehicle.

According to the ninth aspect of the present invention, there is provided an illumination control apparatus for a vehicle comprising the solar sensor described in any one of the first to the sixth aspects of the present invention, and an illumination control unit for receiving the detected signals from the solar sensor to automatically control to turn on or off of lamps for the vehicle based on the detected signals.

According to any one of the first to the ninth aspects of the present invention, by giving attention to the fact that the difference in the transmittance of solar radiation depending on the types of the glass is small in the visible light region in the sun light, the solar sensor is so constructed to have a spectral sensitivity in which the sensitivity ratio is within a range between 0.8 to 5, where the sensitivity ratio is defined as (a sensitivity for wavelengths longer than 700 nm)/(a sensitivity for wavelengths shorter than 700 nm). Thus, the spectral sensitivity of the solar sensor can be set to be closer to the visible light region of sun light than the conventional sensor, so that the variation in the deviation of the output of the solar sensor from the target value depending on the types of the glass can be largely decreased in comparison with the prior-art sensor.

According to the second aspect of the present invention, since the solar sensor is constructed to have a spectral sensitivity with the sensitivity ratio being within 1 to 3, the variation in the deviation of the output of the solar sensor from the target value can be further decreased.

Therefore, when the solar sensor of the present invention is applied to the air conditioning apparatus for the vehicle as described in the eighth aspect of the present invention, the disadvantages of an increase in temperature in the vehicle compartment during cooling, too much cooing in the vehicle compartment, getting worse of the sense of warmth or the feeling for the air conditioning feeling for the passenger, and so forth, due to the deviation of the solar sensor output from the target value depending on the types of the glass, can be efficiently eliminated.

Further, when the solar sensor of the present invention is applied to the illumination control apparatus for the vehicle, variation of on and off timing of the lamps for the vehicle due to the variation in the deviation of the solar sensor output from the target value depending on the types of the glass can be efficiently eliminated.

BRIEF DESCRIPTION OF THE DRAWINGS

The above object and features of the present invention will be more fully understood from the following description of the preferred embodiments, when read in conjunction with the accompanying drawings wherein.

DESCRIPTION OF THE PREFERRED EMBODIMENTS

Figure 1:
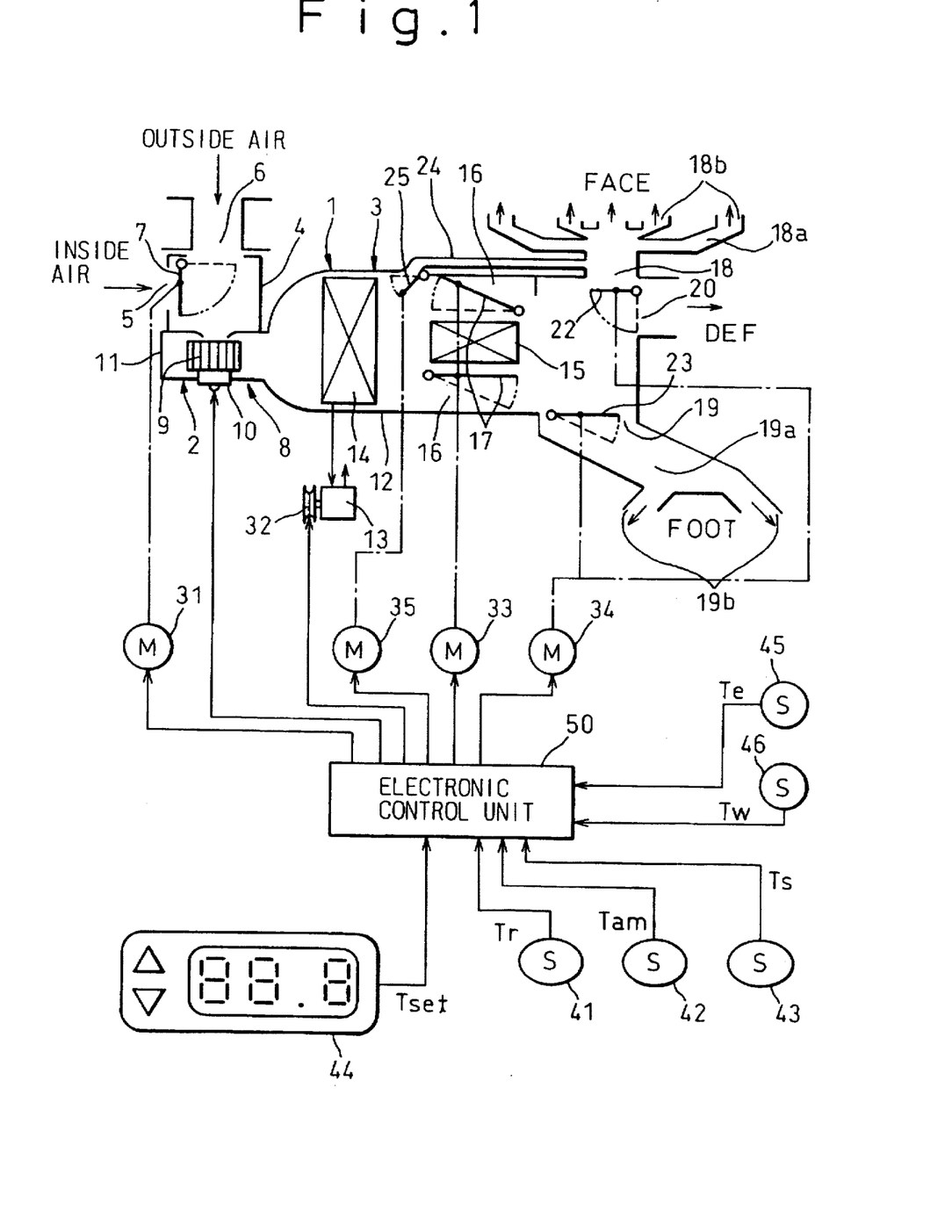
FIG. 1 is a general system construction diagram of an air conditioning apparatus for a vehicle to which a solar sensor according to the invention is applied.

In the following, embodiments of the present invention will be described with reference to the accompanying drawings. First, an outline of an air conditioning apparatus for a vehicle to which a solar sensor of the present invention is applied will be described. In FIG. 1, reference numeral 1 denotes a ventilating system as a whole for the air conditioning apparatus for a vehicle. The main body of this ventilating system 1 is arranged in a lower part of an instrument panel (a part corresponding to a reference numeral 60 in FIG. 5) in a compartment of the vehicle. This ventilating system 1 is constructed by a blowing unit 2 and an air conditioning unit 3. On the upper part of the blowing unit 2, there is provided a switching box 4 for switching between outside air and inside air.

In the switching box 4, there are provided an inside air intake port 5, an outside air (air outside of the passenger compartment) intake port 6, and an inside and outside air switching door 7 for selectively opening or closing the inside air intake port 5 and the outside air intake port 6.

This inside and outside air switching door 7 is driven by a servo motor 31 functioning as an inside and outside air driving means. At the lower side of the inside and outside air switching box 4, there is provided a blowing means 8 which is constructed by a centrifugal blower 9, its driving motor 10 and a scroll casing 11 for accommodating the centrifugal blower 9. p Reference numeral 12 is a case for the air conditioning unit 3. The case 12 is disposed around the central portion of the passenger compartment with respect to the right and left directions, and is coupled to the air outlet portion of the scroll casing 11. In the case 12, an evaporator functioning as an air cooling means is disposed in the upstream side, and a heater core 15 functioning as an air heating means is disposed in the downstream side. In the case 12 also, there are provided bypassing passages 16 for allowing the cooled air cooled by the evaporator 14 to bypass the heater core 15.

The above-mentioned evaporator 14 is a cooling heat exchanger which constructs a well-known refrigerating cycle. The refrigerating cycle is constructed by the evaporator 14, a compressor 13, and a not-shown condenser, a receiver, and a pressure reducing unit, coupled through pipes. The compressor 13 is interconnected through a magnetic clutch 32 to an engine of the vehicle. By intermittent control of the magnetic clutch 32, the compressor 13 is controlled to be driven or to be stopped. The above-mentioned heater core 15 is a heat exchanger for heating again the cooled air cooled by the above-mentioned evaporator 14, using the cooling water (warm water) of the automobile engine as a heat source.

In the bypassing passages 16 provided on both sides of the heater core 15, two air-mixing doors 17 are provided to be rotatably supported with respect to the case 12. The air mixing doors 17 receive the cooled air cooled by the evaporator 14 and are used to adjust the amount of air flowing into the heater core 15 and the amount of air flowing into the bypassing passages 16. In this embodiment, the air mixing doors 17 and the bypassing passages 16 constitute a temperature adjusting means for adjusting the temperature of air to be blown into the passenger compartment.

The air mixing doors 17 are driven by a servo motor 33 functioning as a driving means.

In the case 12, at a downstream end of the ventilating passage, there are provided various air outlet ports 18, 19 and 20 for leading the air to various blowdown ports. That is, the face air outlet port 18 is connected, through a face duct 18a, to the face blowdown port 18b which is opened at a position faced to the upper half body of the passenger in the compartment; the foot air outlet port 18 is connected, through a foot duct 19a, to the foot blowdown port 19b which is opened at a position faced to the feet of the passenger in the compartment; and the defroster air outlet port 20 is connected, through a not-shown defroster duct, to a defroster blowdown port which is opened on the instrument panel of the front seat of the vehicle.

At the inlet portion of the above-mentioned air outlet ports 18, 19 and 20, there are provided doors 22 and 23 for selectively opening or closing the respective outlet ports. The doors 22 and 23 are driven by a servo motor 34 functioning as a driving means.

Reference numeral 24 denotes a cooled air bypassing passage, and reference numeral 25 denotes a cooled air bypassing door for opening or closing the cooled air bypassing passage 24. The cooled air bypassing door 25 is driven by a servo motor 35 functioning as a driving means.

Reference numeral 41 denotes an inside air sensor for detecting the temperature of the air within the vehicle compartment. Reference numeral 42 denotes an outside air sensor for detecting the temperature of the air in the outside of the vehicle compartment. Reference numeral 43 is a solar sensor for detecting the amount of solar radiation transmitted into the vehicle compartment. Reference numeral 44 is a temperature setting unit for manually setting the desired temperature in the compartment. Reference numeral 45 denotes a sensor for detecting the degree of the cooling effected by the evaporator 14. In practice, the sensor 45 is placed at a position immediately after the evaporator 14 so as to detect the temperature of the air immediately after passing through the evaporator 14. Reference numeral 46 denotes a sensor for detecting a degree of heating effected by the heater core 15. In practice, the sensor 46 is attached to a fin or a heater pipe of the heater core 15 so as to indirectly detect the temperature of the water for cooling the engine. The signals from the above-mentioned sensors 41, 42, 43, 45 and 46 and the temperature setting unit 44 are A/D converted and are input into a electronic control unit 50 which includes a microcomputer.

Based on the various signals from the sensors and the temperature setting unit, the electronic control unit 50 outputs control signals to the above-mentioned driving motor 10, the servo motors 31, 33, 34, and 35 and the electromagnetic clutch 32 so as to perform the control of turning ON or OFF of the various door motors, the blowing means, and the compressor.

Figure 2:
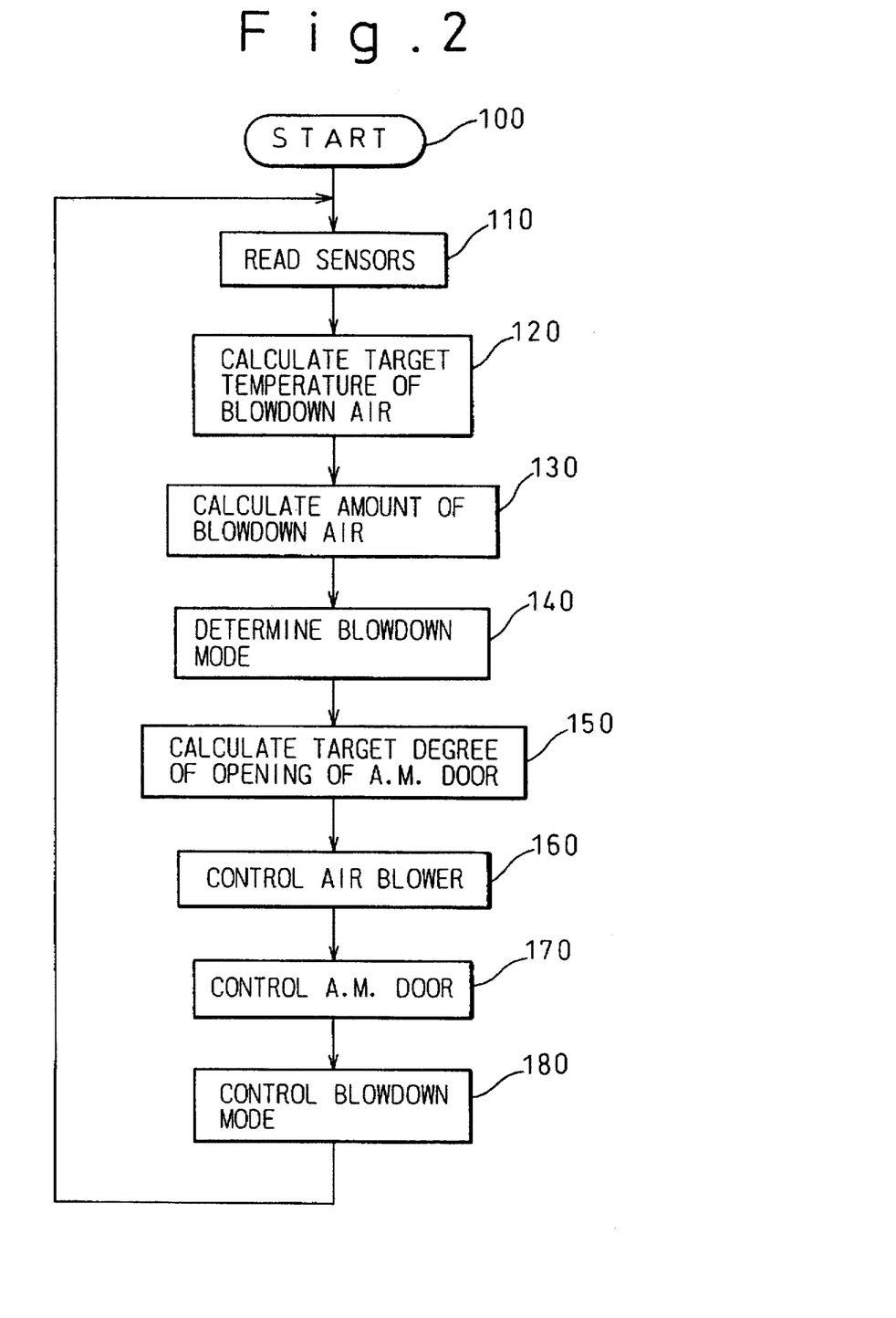
FIG. 2 is a flowchart explaining the control operation by the control unit in FIG. 1.

Next, the control operation by the electronic control unit 50 will be described with reference to FIG. 2.

When the automatic air conditioning mode is selected, an automatic control process of the air conditioning apparatus starts at a step 100. Then, at a step 110, the temperature setting signal Tset from the temperature setting unit 44, and the signals Tr, Tam, Te and Tw from the inside air temperature sensor 42, the outside air temperature sensor 42, the solar sensor 43, the evaporator temperature sensor 45 and the water temperature sensor 46 are respectively read.

Then, at a step 120, based on the following formula, a target blowing temperature (TAO) of the air to be blown into the compartment of the vehicle is calculated.

$$TAO = Ks \times Tset - Kr \times Tr - Kam \times Tam - Ks \times Ts + C$$

where Ks is a temperature setting gain; Kr is an inside air temperature setting gain; Kam is an outside air temperature setting gain; Ks is a gain of the amount of solar radiation; and C is a constant for correction.

Figure 3:
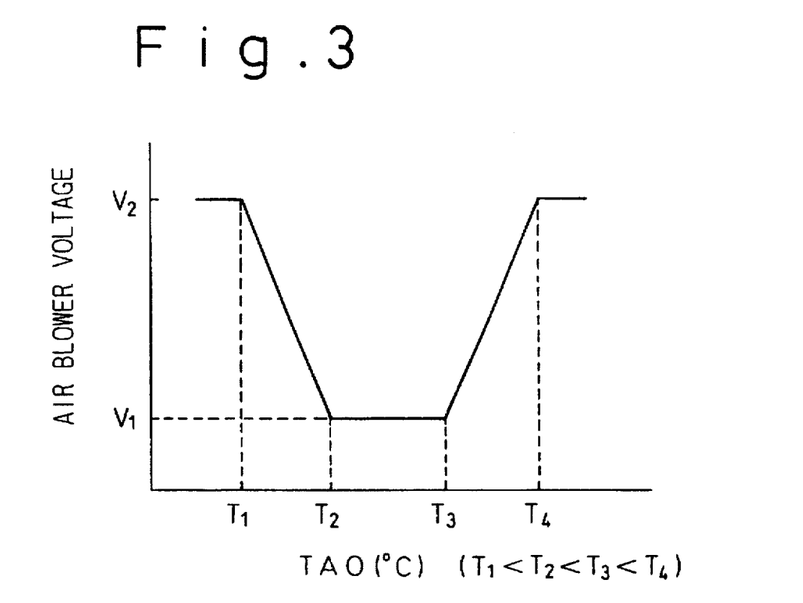
FIG. 3 is a characteristic diagram for controlling an air blower in the flowchart in FIG. 2.

Next, at a step 130, based on the TAO calculated in the step 120, a voltage for an air blower to be applied to the driving motor 10, that is the amount of air, is determined by using the graph shown in FIG. 3.

Figure 4:
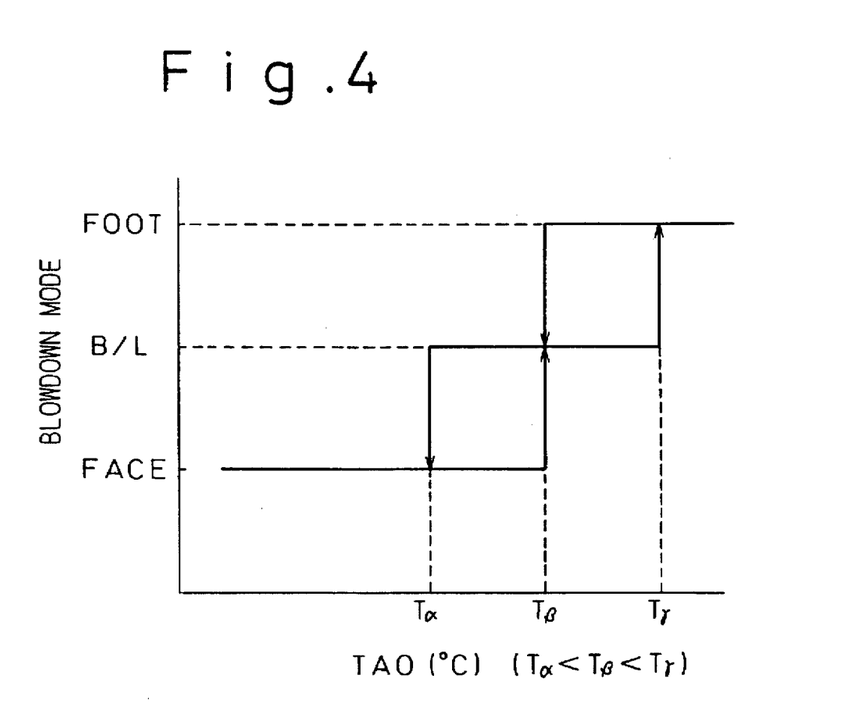
FIG. 4 is a characteristic diagram of a blowdown mode in the flowchart in FIG. 2.

Then, at a step 140, based on the TAO calculated at the step 120, a blowdown mode is determined by using the graph shown in FIG. 4. Here, a face (FACE) mode is a mode in which cooled air is blown from the face blowdown port 18b toward the upper half body of the passenger; a foot (FOOT) mode is a mode in which mainly warm air is blown from the foot blowdown port 19b mainly toward the feet of the passenger; and a bi-level (B/L) mode is a mode in which mainly cooled air is blown from the face blowdown port 18b and mainly warm air is blown from the foot blowdown port 19b.

It should be noted that a defroster mode in which mainly warm air is blown toward the front glass is not determined by the TAO, but is set by turning ON a defroster switch provided on an air conditioning panel.

Then, at a step 150, based on the following formula, a target degree of opening of the air mixing (A.M) door 17 is calculated.

$$SW = \{(TAO-Te)/(Tw-Te)\} \times 100 \ (\%)$$

Then, at steps 160, 170 and 180, based on the calculated values at the above-mentioned steps 130, 140 and 150, the driving motor 10 and the servo motors 31 to 35 are driven to control the centrifugal blower 9, the inside and outside air switching door 7, the compressor 13, the air mixing (A.M) door 17, the door 22, and the cooled air bypassing door 24 to their target values.

Figure 5:
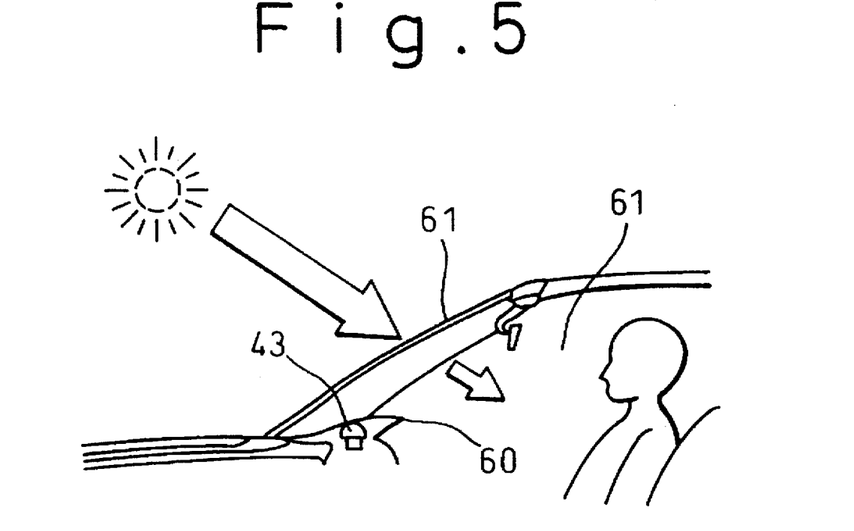
FIG. 5 is a diagram showing, as an example, the setting mode of the solar sensor of the present invention in a compartment of the vehicle.

Next, the solar sensor 43 featured according to the present invention will be described in detail. As shown in FIG. 5, the solar sensor 43 is placed on the upper portion of the instrument panel 60 in the front portion of the driver's seat in the compartment of the vehicle. The solar sensor 43 receives solar light transmitted through the window glass 61 to generate a signal corresponding to the amount of solar radiation. The practical structure of the solar sensor 43 is illustrated as an example in FIG. 6.

Figure 6:
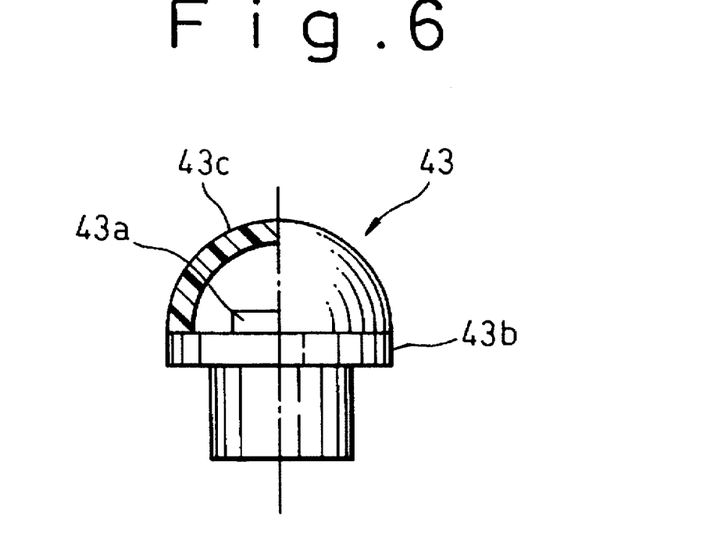
FIG. 6 is a partial cross-sectional view showing, as an example, the practical structure of the solar sensor of the invention.

In FIG. 6, 43a denotes a sensor element which is realized in this embodiment by a photodiode by which the amount of the received solar radiation is in proportion to the output current. 43b is a pedestal, made of resin, for supporting and fixing the sensor element 43a and its lead wires (not shown). The pedestal 43b has a circular configuration. 43c is a cover member which is molded in a half sphere and is transparent to light. The cover 43c is fixed to the outer periphery of the pedestal 43b in such a way that the sensor element 43c covers the sensor element 43a.

The cover member 43c is, in this embodiment, molded of a transparent resign material for transmitting the solar radiation.

Figure 7:
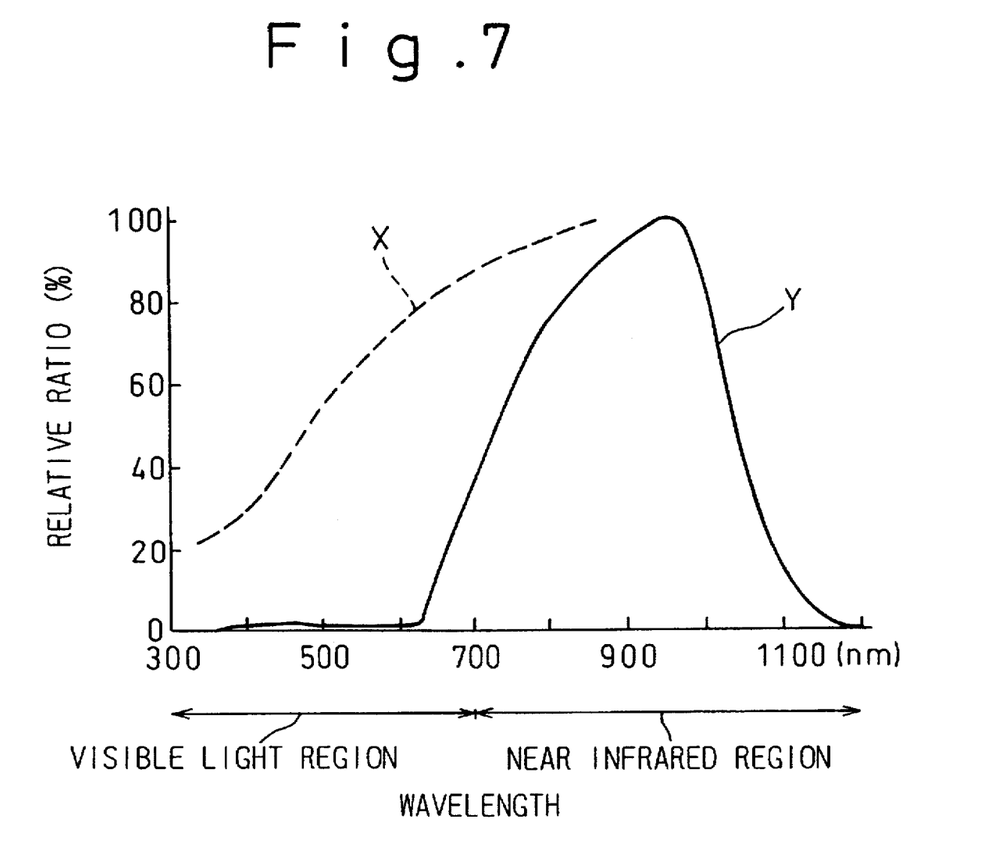
FIG. 7 is a graph showing the relation between the wavelength of the light received by the solar sensor and the sensor sensitivity.

In this connection, the sensitivity of a conventional photo diode used as the sensor element 43c, that is, the spectral sensitivity, has a characteristic which has the peak of light sensitivity for a wavelength in the near infrared region, and has a sensitivity ranging from the visible light region to the infrared region, as shown by a dash line X in FIG. 7. Here, the vertical axis in FIG. 7 represents a relative ratio of the output of the photodiode with respect to the output at the peak sensitivity.

When the trim cover, proposed in the Japanese Utility Model Publication No. 3-109484, is used, most of the light of the visible light region is cut so that the characteristic becomes as shown by a solid line Y in FIG. 7.

Figure 8:
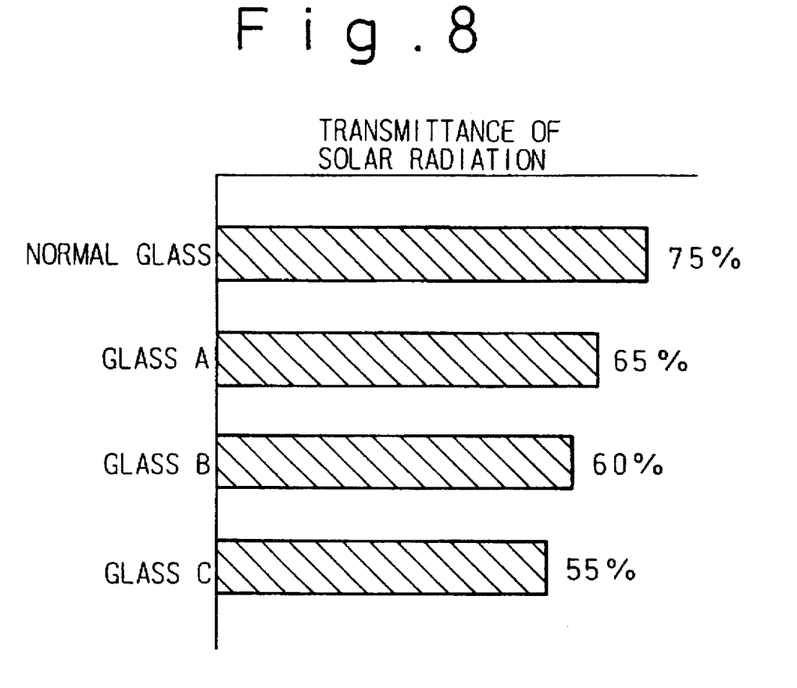
FIG. 8 is a graph showing the relation between the types of the glass and the solar radiation transmittances of the glass.

On the other hand, the solar sensor 43 receives solar radiation transmitted through the window glass 61 of the vehicle, as shown in FIG. 5. Therefore, the sensitivity of the solar sensor 43 is considerably influenced by the light transparency characteristic of the window glass 61. In recent year, however, as the window glass 61, in order to reduce thermal load for the vehicle, glass A, B, or C, as shown in FIG. 8, having a lower transmission rate for solar radiation in comparison with normal glass have been developed and cases of employing such a glass have increased, in particular, in high-class vehicles.

Figure 9:
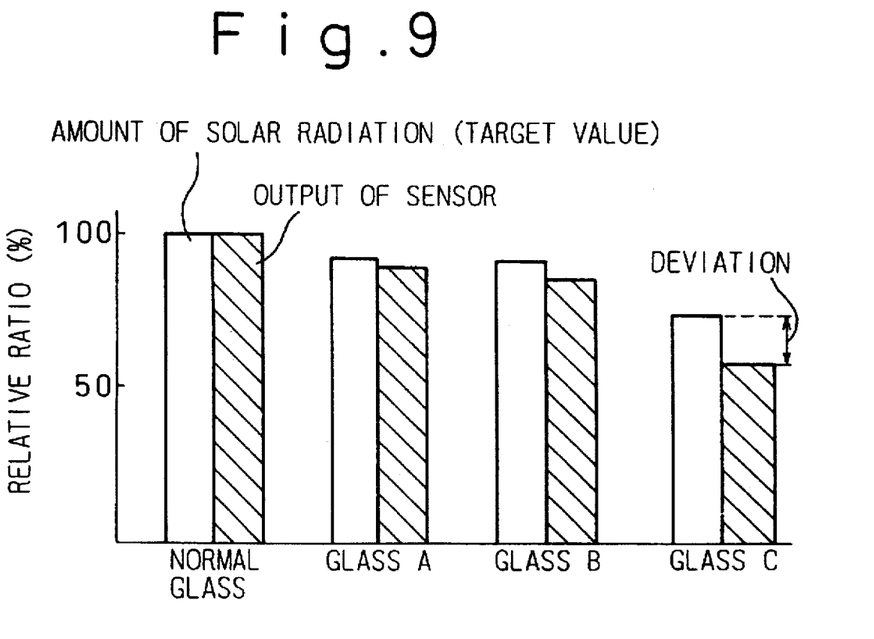
FIG. 9 is a graph showing the variation in the deviation of the sensor output from the amount of solar radiation, depending on the types of the glass.

According to experiments and research conducted by the inventors of the present invention, however, it has been found that the deviation of the total amount of solar radiation transmitted into the vehicle compartment from the sensor output varies depending on the transmittance of solar radiation through the glass, that is, depending on the types of the glass. FIG. 9 shows the variation of the deviation in the sensor outputs depending on the type of the glass. In FIG. 9, the vertical axis represents the amount of solar radiation and the sensor output, shown by relative ratios, when the amount of solar radiation transmitted through the normal glass and the sensor output in response to the solar radiation are both assumed to be 100%.

As shown in FIG. 9, in a vehicle employing the glass A, B, or C, the difference between the amount of solar radiation and the sensor output varies depending on the employed glass. Because of this variation, the calculation of the target blowdown temperature in the step 120 in FIG. 2 cannot be correctly carried out, so that it has been found that there arose problems of introducing such disadvantages as an increase in temperature of the vehicle compartment during cooling or a worsening of the sense of warmth or cool for the passenger.

Figure 10:
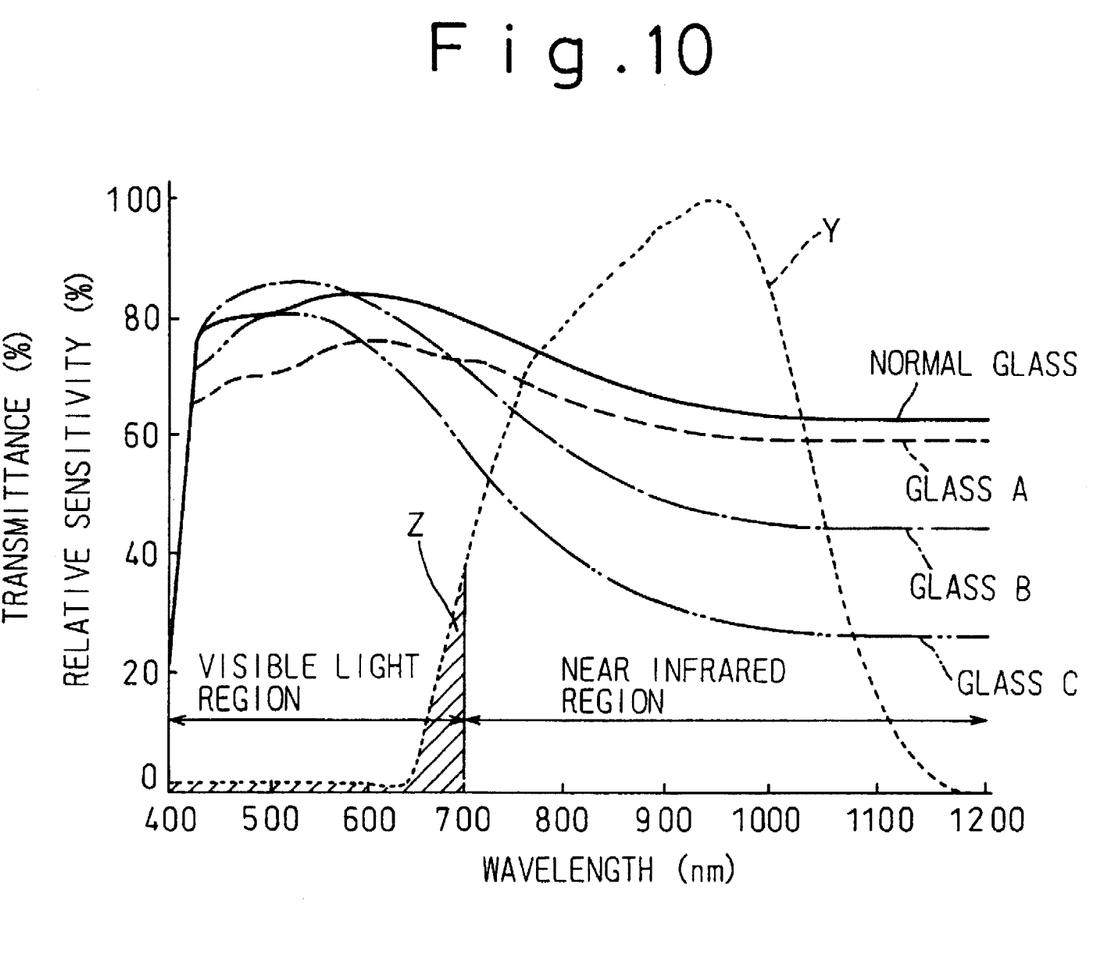
FIG. 10 is a graph showing the relation between the wavelength of light received by the solar sensor and the sensitivity of the sensor and the solar radiation transmittance.

The reason why the above-mentioned deviation varies is that, as shown in FIG. 10, the transmittances of light through the glass, especially in a near infrared region, are different to each other depending on the types of the glass, and the spectral-response characteristic Y of the sensor element 43a (or, in other words, the sensor wavelength absorption characteristic) shows that the sensor 43a is sensitive in the near infrared region, so that the sensor output is largely influenced by the type of the glass.

On the other hand, the amount of solar radiation is the sum of the radiation in the visible light region and the radiation in the near infrared region. Further, the change in the transmittance of light for each glass in the visible light region is small. Therefore, the following relationship is established: the total amount of solar radiation in the vehicle compartment>the amount of solar radiation corresponding to sensor output.

As a result, a correcting value for increasing the cooling effect in response to the amount of solar radiation becomes insufficient so that the temperature in the vehicle compartment increases.

Through the experiments and research done by the inventors of the present invention, the reason for the variation of the derivation between the total amount of solar radiation and the amount of solar radiation corresponding to the sensor output has become clear as mentioned above. According to the present invention, based on the analysis of the above reason, the sensitivity of the sensor element 43a is shifted to be sensitive to the light in a region closer to the visible light region than the sensitive region for the conventional sensor element, thereby eliminating the problems of an insufficient correcting value for the cooling effect.

As a method to set the sensitivity of the sensor element 43a to be in a region closer to the visible light region than the sensitive region for the conventional sensor element, the peak position of the relative sensitivity shown in FIG. 10 is shifted to a position closer to the visible light region than the peak position of the relative sensitivity of the conventional sensor element. By this shift, an integration value of the relative sensitivities in the visible light region (an area Z in FIG. 10) is increased. That is, the relative sensitivity in the visible light region can be improved. Thus, the inventors of the present invention have directed their attention to the integration value of the relative sensitivities in the visible light region, that is, the sensitivity for the wavelengths shorter than 700 nm, and have made a plan to evaluate the value of the output deviation of the solar sensor 43 by comparing the sensitivity for the wavelength longer than 700 nm with the sensitivity for the wavelength shorter than 700 nm. In the present invention, the sensitivity ratio $\alpha$ is expressed by:

$\alpha$=(sensitivity for the wavelength longer than 700 nm)/
(the sensitivity for the wavelength shorter than 700 nm)

It should be noted that the denominator of the above expression, i.e., the sensitivity to the wavelength longer than 700 nm, is defined as an integration of the relative sensitivities longer than 700 nm, that is, in FIG. 10, an area formed by the curve of relative sensitivity for each glass and the horizontal axis in the region longer than 700 nm. Similarly, the numerator of the sensitivity ratio $\alpha$ is defined as an integration of the relative sensitivities shorter than 700 nm, that is, in FIG. 10, an area formed by the curve of relative sensitivity for each glass and the horizontal axis in the region shorter than 700 nm. Then, by determining the relation between this sensitivity ratio $\alpha$ and the deviation of the sensor output from the target value, i.e., the total amount of solar radiation, the sensitivity ratio $\alpha$ is determined in such a way that the output deviation of the sensor due to the difference in light transmittance characteristics depending on the types of the glass is minimized.

Figure 11:
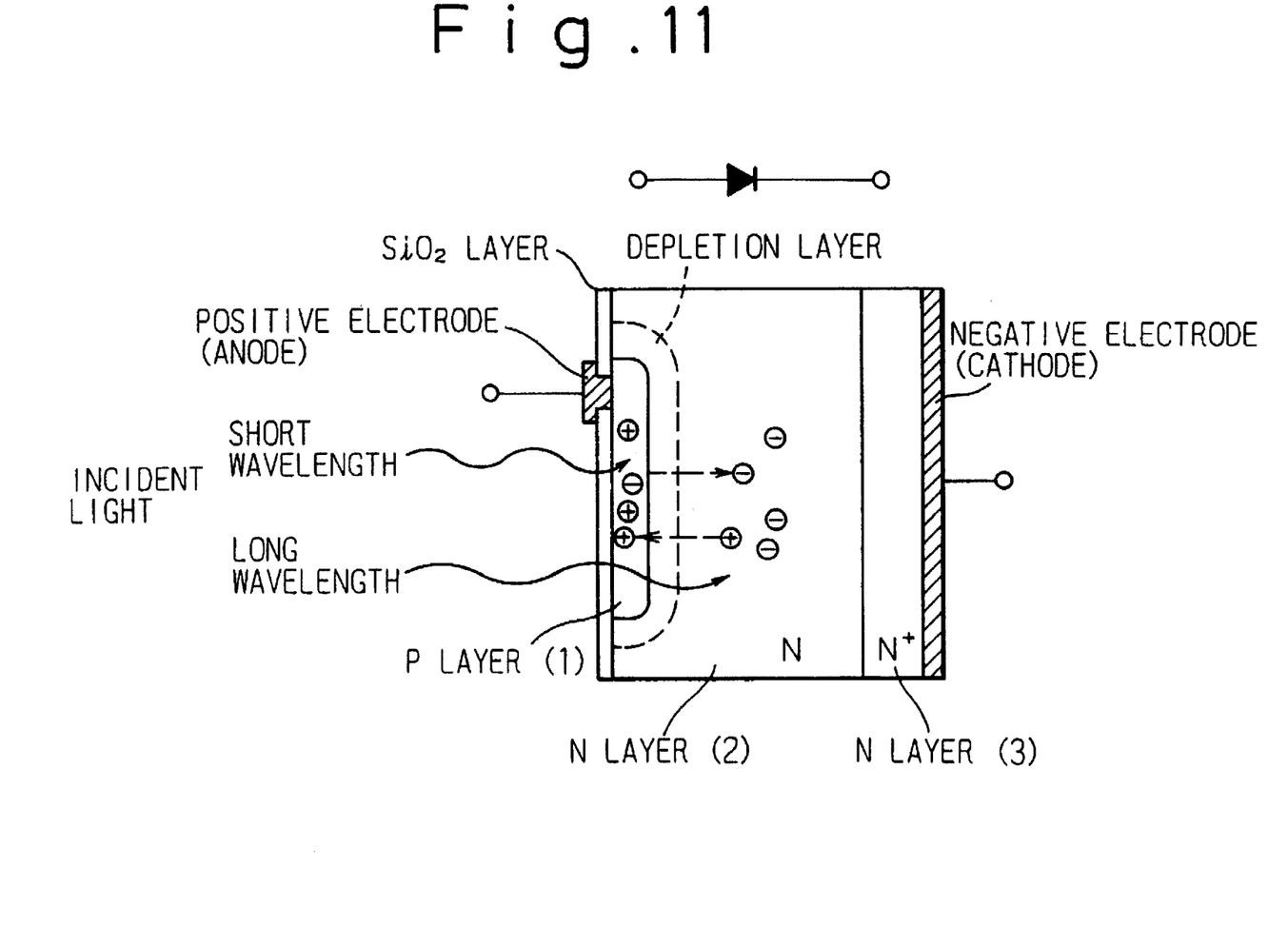
FIG. 11 is a cross sectional diagram diagrammatically showing the practical structure of a photodiode used as the solar sensor of the present invention.

The sensitivity ratio $\alpha$ of the solar sensor 43 can be set to have any value by changing the wave absorbing characteristic. Practical means to change the wave absorbing characteristic will be described in the following. FIG. 11 is a cross-sectional view of a photodiode used as the sensor element 43a. The wavelength absorbing characteristic can be adjusted to a target characteristic by changing or adjusting the thicknesses of the surface P layer (1), the substrate N layer (2) and the bottom surface N layer (3), the impurity concentrations of these layers (1)–(3), and so forth.

Figure 12:
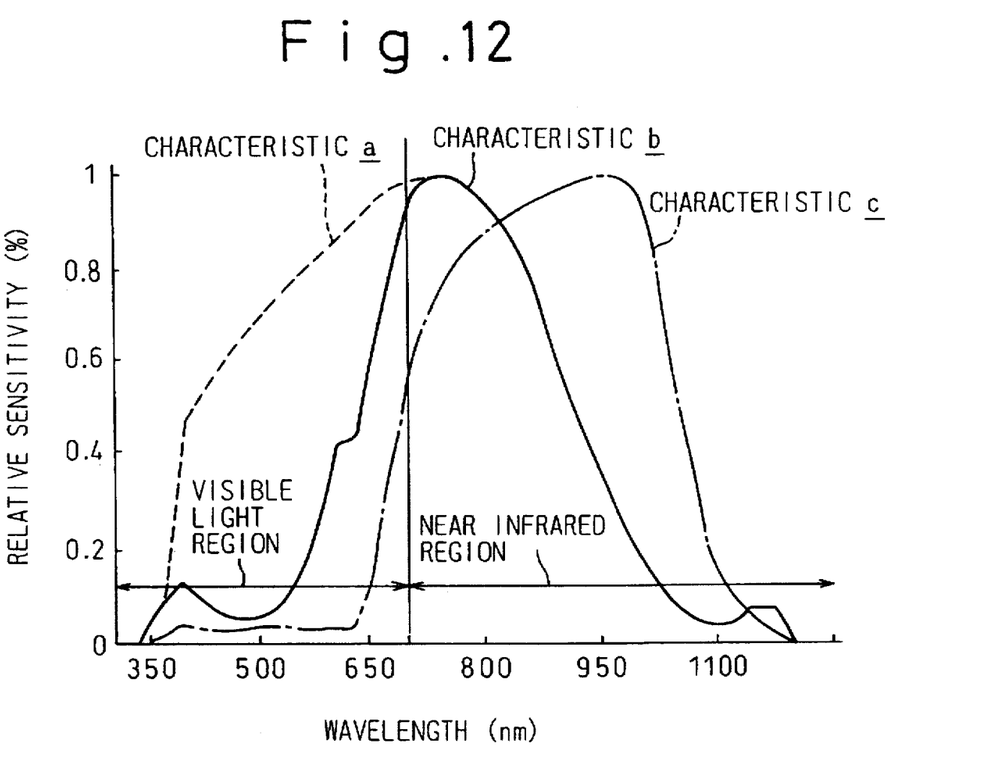
FIG. 12 is a graph showing the relation between the wavelength of light received by the solar sensor and the sensitivity of the sensor.

Thus, the inventors of the present invention have prepared sensors having different characteristics a, b and c. The relative sensitivities of these sensors with respect to wavelengths are shown in FIG. 12. In FIG. 12, a curve with a characteristic a is a curve when the sensitivity ratio α is 0.9, and a curve with a characteristic b is a curve when the sensitivity ratio α is 2.2. The sensors having these characteristics a and b are those within the scope of the present invention because the sensitive region in the visible light region is expanded. In contrast, a carve with a characteristic c is a curve when the sensitivity ratio is 8.0. This sensor having the characteristic c is sensitive mainly in the near infrared region so that this sensor is a conventional sensor similar to the solar sensor disclosed in the Japanese Utility Model Application No. 3-109484.

Figure 13:
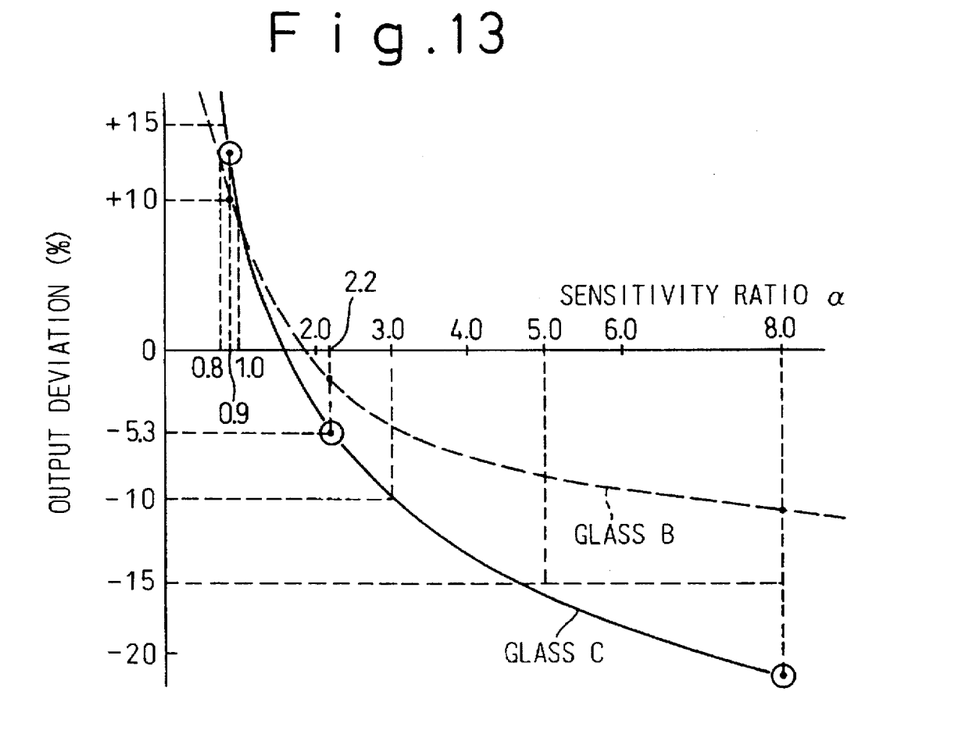
FIG. 13 is a graph showing the relation between sensitivity ratio α and the sensor output deviation from the target value.

FIG. 13 is a graph showing the relation between the output deviation from the target value when the glass B or C is employed and the sensitivity ratio α. Here, the output deviation is defined as:

output deviation = [{(actual sensor output value) −

(target value)}/(target value)] × 100(%)

The condition for measuring the solar radiation is: the amount of solar radiation is 700–800 w/m², fine weather.

First, from the result of the characteristic a for the glass C in which the sensitivity ratio α is 0.9, it will be seen that, when the sensitivity ratio α is extremely small, the sensor 43a reads mainly the amount of solar radiation in the visible light region where the change of the transmittance depending on the types of the glass is relatively small, but the read amount of solar radiation in the near infrared region, where the change of the transmittance depending on the types of the glass is relatively large as shown in FIG. 10, is relatively small. Therefor, in this case, the sensor 43a has little ability to output the difference between the amounts of solar radiation depending on the types of the glass. When the transmittance for solar radiation in the glass is largely lowered, the target value is also lowered. Therefor, as will be seen from the above expression of the output deviation, the sensor output becomes larger than the amount of solar radiation in the vehicle compartment, so that the amount of correction to increase the cooling ability is increased too much, resulting in a problem in that the temperature in the vehicle compartment is lowered to lower than the set temperature, causing too much cooling.

As shown in FIG. 13, the inventors of the present invention have acknowledged by their experiments that, for the glass C, when the sensitivity ratio α is 0.8 or more, the output deviation is +15% or below, and the actual blowdown temperature at the maximum amount of solar radiation (1 kw/m²) is never lowered to be lower than the target blowdown temperature by 3° C. or more, and the room temperature is not lowered to be lower than the target room temperature by 1° C. or more. Accordingly, the problem of too much cooling does not arise. Further, the inventors of the present invention have acknowledged by their experiments that, for the class C, when the sensitivity ratio α is 5.0 or less, the output deviation is −15% or more, and the actual blowdown temperature at the maximum amount of solar radiation is never increased to be higher than the target blowdown temperature by 3° C. or more, and the room temperature is not increased to be higher than the target room temperature by 1° C. or more. Accordingly, the problem that the cooling is not effective is eliminated.

Further, in FIG. 13, when the sensitivity ratio α is in the range between 1 and 3, the output deviation is within ±10% so that the actual blowdown temperature can be made close to the target blowdown temperature.

In the above description, the range of the sensitivity ratio α is determined for the glass C which causes the largest sensor output deviation in response to the amount of solar radiation, however, also for the glass A or B causing a smaller sensor output deviation than the glass C, when the sensitivity ratio α is within the range between 1 and 3, it can be presumed that the output deviation is within ±10%. This presumption is considered to be correct from the result for the glass B shown in FIG. 13.

Figure 14:
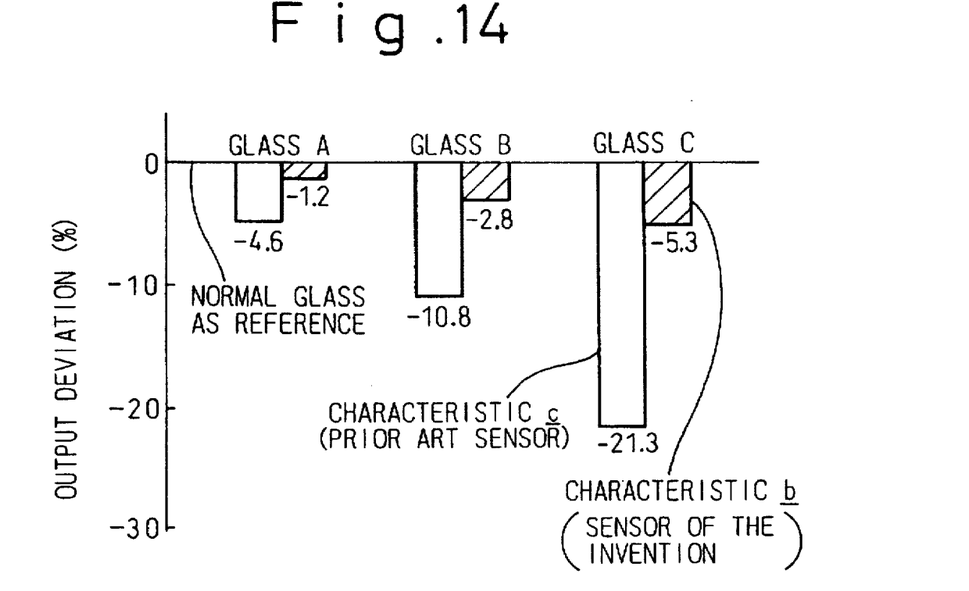
FIG. 14 is a graph showing the relation between type of the glass and the sensor output deviation.

FIG. 14 is a graph showing, by comparing, the output deviations of a conventional sensor and the sensor with the characteristic b of the present invention. In FIG. 14, the output deviation when the normal glass is used is shown as a reference (zero), and the output deviations of the conventional solar sensor 43 when the glasses A, B and C are used are expressed by white bars. The output deviations of the sensor with the characteristic b are shown in FIG. 14 are illustrated by slash-line bars.

As can be understood from the experimental results shown in FIG. 14, by using the sensor with the characteristic b (α=2.2) according to the present invention, the output deviations due to the differences of the types of the glass can be largely decreased in comparison with the conventional sensor. Also, as shown in FIG. 12, the peak sensitivity of the characteristic b is realized at the wavelength of 750 nm, and the output deviation is −5.3% as shown in FIG. 13. In order to further decrease the output deviation, the sensitivity ratio α may be made to be further smaller than 2.2 in FIG. 13. By shifting the wavelength of the peak sensitivity to the shorter wavelength side of 750 nm, the sensitivity for the wavelength shorter than 700 nm, which is the denominator, is increased, and the sensitivity for the wavelength longer than 700 nm, which is the numerator of the sensitivity ratio, is decreased, so that the sensitivity ratio α can be made small. From the experience of the inventors of the present invention, it can be presumed that the output deviation of the solar sensor can be further decreased when the peak sensitivity is realized at the wavelength of 650 nm, and when the peak sensitivity is realized within a range of 650 nm±150 nm=500–800 nm.

It is also possible to decrease the sensitivity ratio α without shifting the wavelength for the peak sensitivity but by increasing the sensitivity for the wavelengths shorter than 700 nm (by increasing the integration value of the relative sensitivities in the region of the wavelengths shorter than 700 nm), so as to increase the sensitivity for the wavelengths shorter than 700 nm, which is the denominator of the sensitivity ratio α.

In the above-described embodiment, in order for the spectral sensitivity of the solar sensor 43 to be set as above, the wavelength absorption characteristic of the sensor element 43a itself is changed. However, it is also possible for the spectral sensitivity of the solar sensor 43 to be set as above by making the light transparent cover member 43c to have a filtering function to selectively penetrate light.

That is, it may also be possible to make the light transparent cover member 43c of a material having such a characteristic that light in the range of 500 nm to 800 nm is selectively transmitted and the light in the wavelength band other than that range is cut, so that the light in the range of 500 nm to 800 nm is mainly incident on the solar sensor 43.

In the above-described embodiment, the solar sensor 43 is used for automatically control of an air conditioning apparatus for a vehicle, however, the sensor 43 of the present invention may also be applied to an illumination control apparatus for a vehicle for automatically turning on or off of lamps for a vehicle (such as head lamps, side marker lamps, etc.) in accordance with the ambient illuminance.

That is, the detection signal from the sensor 43 of the present invention may be input into illumination control means, and in accordance with the ambient illuminance of vehicle, the lamps for the vehicle may be turned on or off automatically by the illumination control means.

In the above-described embodiment, as the sensor element 43a in the solar sensor 43, a photodiode in which the output current is proportional with the amount of incident solar radiation is used, however, according to the present invention, it may also be possible to use, as the sensor element 43a, an element such as a solar battery which generates an electromotive force in accordance with the amount of solar radiation.

What is claimed is:

1. A solar sensor for a vehicle, for receiving incident solar radiation transmitted through a window glass of the vehicle, wherein said solar sensor has a sensitivity in a wavelength band from a visible light region to a near infrared region, and said solar sensor has a spectral sensitivity with a sensitivity ratio within a range from 0.8 to 5.0, the sensitivity ratio being expressed as:

(a sensitivity for a wavelength longer than 700 nm)/(a sensitivity for a wavelength shorter than 700 nm).

2. A solar sensor as claimed in claim 1, wherein said solar sensor has a spectral sensitivity with a sensitive ratio within a range from 1 to 3.

3. A solar sensor as claimed in claim 1 or 2, wherein the peak of said spectral sensitivity resides within a range between 500 nm and 800 nm among the solar radiation wavelength band.

4. A solar sensor as claimed in claim 1 or 2, comprising:

a sensor element for generating a signal in accordance with the amount of solar radiation of the sun light; and a cover member with light transparent characteristic, arranged to cover the sensor element; and a pedestal for supporting said sensor element and said cover member.

5. A solar sensor as claimed in claim 1 or 2, comprising:

a sensor element for generating a signal in accordance with the amount of solar radiation of the sun light; and a cover member with light transparent characteristic, arranged to cover the sensor element;

said sensor element satisfying the condition of said spectral sensitivity.

6. A solar sensor as claimed in claim 1 or 2, comprising:

a sensor element for generating a signal in accordance with the amount of solar radiation of the sun light; and a cover member with light transparent characteristic, arranged to cover the sensor element;

said cover member selectively transmitting solar light having a wavelength band between 500 nm and 800 nm so as to satisfy the condition of said spectral sensitivity.

7. A solar sensor as claimed in claim 3, comprising:

a sensor element for generating a signal in accordance with the amount of solar radiation; and a cover member with light transparent characteristic, arranged to cover the sensor element; and a pedestal for supporting said sensor element and said cover member.

8. A solar sensor as claimed in claim 3, comprising:

a sensor element for generating a signal in accordance with the amount of solar radiation; and a cover member with light transparent characteristic, arranged to cover the sensor element;

said sensor element satisfying the condition of said spectral sensitivity.

9. A solar sensor as claimed in claim 3, comprising:

a sensor element for generating a signal in accordance with the amount of solar radiation of the sun light; and a cover member with light transparent characteristic, arranged to cover the sensor element;

said cover member selectively transmitting solar light having a wavelength band between 500 nm and 800 nm so as to satisfy the condition of said spectral sensitivity.

10. A control apparatus for a vehicle comprising:

a solar sensor having a sensitivity in a wavelength band from a visible light region to a near infrared region, and having a spectral sensitivity with a sensitivity ratio within a range from 0.8 to 5.0, the sensitivity ratio being expressed as:

(a sensitivity for a wavelength longer than 700 nm)/(a sensitivity for a wavelength shorter than 700 nm); and a control means for receiving the detected signals from said solar sensor to drive and control apparatuses mounted in the vehicle.

11. A control apparatus as claimed in claim 10, wherein said solar sensor has a spectral sensitivity with a sensitive ratio within a range from 1 to 3.

12. A control apparatus as claimed in claim 10 or 11, wherein the peak of said spectral sensitivity resides within a range between 500 nm and 800 nm among the solar radiation wavelength band.

13. A control apparatus as claimed in claim 10 or 11, comprising:

a sensor element for generating a signal in accordance with the amount of solar radiation of the sun light;

a cover member with light transparent characteristic, arranged to cover the sensor element; and a pedestal for supporting said sensor element and said cover member.

14. A control apparatus as claimed in claim 10 or 11, comprising:

a sensor element for generating a signal in accordance with the amount of solar radiation of the sun light; and a cover member with light transparent characteristic, arranged to cover the sensor element;

said sensor element satisfying the condition of said spectral sensitivity.

15. A control apparatus as claimed in claim 10 or 11, comprising:

a sensor element for generating a signal in accordance with the amount of solar radiation of the sun light; and a cover member with light transparent characteristic, arranged to cover the sensor element;

said cover member selectively transmitting solar light having a wavelength band between 500 nm and 800 nm so as to satisfy the condition of said spectral sensitivity.

16. A control apparatus as claimed in claim 12, comprising:

a sensor element for generating a signal in accordance with the amount of solar radiation of the sun light; and a cover member with light transparent characteristic, arranged to cover the sensor element; and a pedestal for supporting said sensor element and said cover member.

17. A control apparatus as claimed in claim 12, comprising:

a sensor element for generating a signal in accordance with the amount of solar radiation of the sun light; and a cover member with light transparent characteristic, arranged to cover the sensor element;

said sensor element satisfying the condition of said spectral sensitivity.

18. A control apparatus as claimed in claim 12, comprising:

a sensor element for generating a signal in accordance with the amount of solar radiation of the sun light; and a cover member with light transparent characteristic, arranged to cover the sensor element;

said cover member selectively transmitting solar light having a wavelength band between 500 nm and 800 nm so as to satisfy the condition of said spectral sensitivity.

19. An air conditioning control apparatus for a vehicle comprising:

a solar sensor having a sensitivity in a wavelength band from a visible light region to a near infrared region, and having a spectral sensitivity with a sensitivity ratio within a range from 0.8 to 5.0, the sensitivity ratio being expressed as:
(a sensitivity for a wavelength longer than 700 nm)/(a sensitivity for a wavelength shorter than 700 nm); and an air conditioning control means for receiving the detected signals from said solar sensor to control the air conditioning state of an air conditioning apparatus for the vehicle.

20. An air conditioning control apparatus as claimed in claim 19, wherein said solar sensor has a spectral sensitivity with a sensitive ratio within a range from 1 to 3.

21. An air conditioning control apparatus as claimed in claim 19 or 20, wherein the peak of said spectral sensitivity resides within a range between 500 nm and 800 nm among the solar radiation wavelength band.

22. An air conditioning control apparatus as claimed in claim 19 or 20, comprising:

a sensor element for generating a signal in accordance with the amount of solar radiation;

a cover member with light transparent characteristic, arranged to cover the sensor element; and a pedestal for supporting said sensor element and said cover member.

23. An air conditioning control apparatus as claimed in claim 19 or 20, comprising:

a sensor element for generating a signal in accordance with the amount of solar radiation of the sun light; and a cover member with light transparent characteristic, arranged to cover the sensor element;

said sensor element satisfying the condition of said spectral sensitivity.

24. An air conditioning control apparatus as claimed in claim 19 or 20, comprising:

a sensor element for generating a signal in accordance with the amount of solar radiation of the sun light; and a cover member with light transparent characteristic, arranged to cover the sensor element;

said cover member selectively transmitting solar light having a wavelength band between 500 nm and 800 nm so as to satisfy the condition of said spectral sensitivity.

25. An air conditioning control apparatus as claimed in claim 22, comprising:

a sensor element for generating a signal in accordance with the amount of solar radiation of the sun light;

a cover member with light transparent characteristic, arranged to cover the sensor element; and a pedestal for supporting said sensor element and said cover member.

26. An air conditioning control apparatus as claimed in claim 22, comprising:

a sensor element for generating a signal in accordance with the amount of solar radiation; and a cover member with light transparent characteristic, arranged to cover the sensor element;

said sensor element satisfying the condition of said spectral sensitivity.

27. An air conditioning control apparatus as claimed in claim 22, comprising:

a sensor element for generating a signal in accordance with the amount of solar radiation; and a cover member with light transparent characteristic, arranged to cover the sensor element;

said cover member selectively transmitting solar light having a wavelength band between 500 nm and 800 nm so as to satisfy the condition of said spectral sensitivity.

28. An illumination control apparatus for a vehicle comprising:

a solar sensor having a sensitivity in a wavelength band from a visible light region to a near infrared region, and having a spectral sensitivity with a sensitivity ratio within a range from 0.8 to 5.0, the sensitivity ratio being expressed as:
(a sensitivity for a wavelength longer than 700 nm)/(a sensitivity for a wavelength shorter than 700 nm); and an illumination control means for receiving the detected signals from said solar sensor to automatically control to turn on or off lamps for the vehicle based on the detected signals.

29. An illumination control apparatus as claimed in claim 28, wherein said solar sensor has a spectral sensitivity with a sensitive ratio within a range from 1 to 3.

30. An illumination control apparatus as claimed in claim 28 or 29, wherein the peak of said spectral sensitivity resides within a range between 500 nm and 800 nm among the solar radiation wavelength band.

31. An illumination control apparatus as claimed in claim 28 or 29, comprising:

a sensor element for generating a signal in accordance with the amount of solar radiation;

a cover member with light transparent characteristic, arranged to cover the sensor element; and a pedestal for supporting said sensor element and said cover member.

32. An illumination control apparatus as claimed in claim 28 or 29, comprising:

a sensor element for generating a signal in accordance with the amount of solar radiation of the sun light; and a cover member with light transparent characteristic, arranged to cover the sensor element;

said sensor element satisfying the condition of said spectral sensitivity.

33. An illumination control apparatus as claimed in claim 28 or 29, comprising:

a sensor element for generating a signal in accordance with the amount of solar radiation of the sun light; and a cover member with light transparent characteristic, arranged to cover the sensor element;

said cover member selectively transmitting solar light having a wavelength band between 500 nm and 800 nm so as to satisfy the condition of said spectral sensitivity.

34. An illumination control apparatus as claimed in claim 30, comprising:
   a sensor element for generating a signal in accordance with the amount of solar radiation;
   a cover member with light transparent characteristic, arranged to cover the sensor element; and
   a pedestal for supporting said sensor element and said cover member.

35. An illumination control apparatus as claimed in claim 30, comprising:
   a sensor element for generating a signal in accordance with the amount of solar radiation of the sun light; and
   a cover member with light transparent characteristic, arranged to cover the sensor element;
   said sensor element satisfying the condition of said spectral sensitivity.

36. An illumination control apparatus as claimed in claim 30, comprising:
   a sensor element for generating a signal in accordance with the amount of solar radiation; and
   a cover member with light transparent characteristic, arranged to cover the sensor element;
   said cover member selectively transmitting solar light having a wavelength band between 500 nm and 800 nm so as to satisfy the condition of said spectral sensitivity.

* * * * *